(12) United States Patent
Kinoshita

(10) Patent No.: US 7,010,130 B1
(45) Date of Patent: Mar. 7, 2006

(54) NOISE LEVEL UPDATING SYSTEM

(75) Inventor: Kazuya Kinoshita, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/270,273

(22) Filed: Mar. 16, 1999

(30) Foreign Application Priority Data

Mar. 20, 1998 (JP) .................................. 10-072904

(51) Int. Cl.
  *H04B 15/00* (2006.01)

(52) U.S. Cl. ..................................... 381/94.1; 381/104

(58) Field of Classification Search .................. 381/58, 381/59, 94.3, 94.1, 104, 106, 107, 94.8
See application file for complete search history.

(56) References Cited

U.S. PATENT DOCUMENTS 5,293,588 A * 3/1994 Satoh et al. ................. 704/233
5,757,937 A * 5/1998 Itoh et al. ................... 381/94.3

* cited by examiner

Primary Examiner—Ping Lee
(74) Attorney, Agent, or Firm—Arent Fox PLLC

(57) ABSTRACT

A noise level of an input signal is detected, and a detected noise level is held in a noise level holding section. The held noise level is updated when a subsequent noise level largely changes.

1 Claim, 5 Drawing Sheets

… … …

NOISE LEVEL UPDATING SYSTEM

BACKGROUND OF THE INVENTION

The present invention relates to a noise level updating system for reducing a noise component included in an input signal.

Heretofore, a noise reduction system, wherein a signal component having a level lower than a predetermined level is cut as noises, is known.

The present applicant has disclosed a noise reduction system in the Japanese Patent Application Laid Open (Japanese Patent Application 9-310231). In the system, a noise level of a sound portion of an inputted music signal is detected by a noise analysis section, a signal lower than the noise level is cut.

The noise analysis section will be described with reference to FIG. 4. A high frequency component higher than 13 KHz is extracted from an input signal Si by a high pass filter 1 to produce a high pass signal Sh. The high pass signal Sh is converted to a rectified signal Shn by a rectifier circuit 2, and a low frequency region (an envelop component of the rectified signal Shn) is extracted by a low pass filter 3 to produce an extracted signal Sln which is inputted in a level analysis circuit 4.

On the other hand, the input signal Si is also applied to a rectifier circuit 5, thereby producing a rectified signal Sin which is fed to a low pass filter 6 to produce an extracted signal Sl. The extracted signal is fed to the level analysis circuit 4. The level analysis circuit 4 samples signals Sln and Sl and holds a minimum value, and produces the minimum value as a noise level detecting signal Sa based on the extracted signals Sin and Si.

Referring to FIGS. 5a to 5c, FIG. 5a shows a waveform of an entire frequency region of the input music signal Si, and FIG. 5b shows signals Shn (solid line), Sln (dotted line).

FIG. 5c shows a waveform of the signal Sa. As shown in FIG. 5c, the level analysis circuit 4 produces a minimum value at every sampling timing as the signal Sa. Last of all, the minimum value signal Sa is held constant.

However, since the minimum value signal Sa is held constant, noises can not be reduced when the level of the noises heightens.

SUMMARY OF THE INVENTION

An object of the present invention is to provide a noise reduction system which may remove noises even if the level of noise changes.

According to the present invention, there is provided a noise level updating system comprising, detector means for detecting a noise level of an input signal, a noise level holding section for holding a noise level detected by the detector means as a reference value, determining means for determining updating of the noise level held in the noise level holding section based on a plurality of subsequent noise levels and updating means for updating the held noise level in accordance with determination of the determining means.

The determining means determines the updating of the held noise level when the difference between the subsequent noise levels is smaller than a predetermined value and the difference between the held noise level and the subsequent noise levels is larger than a predetermined value.

In another aspect of the present invention, the determining means determines the updating of the held noise level when the difference between an average value of the subsequent noise levels and the held noise level is larger than a predetermined value.

These and other objects and features of the present invention will become more apparent from the following detailed description with reference to the accompanying drawing.

DETAILED DESCRIPTION OF THE PREFERRED EMBODIMENT

Figure 1:
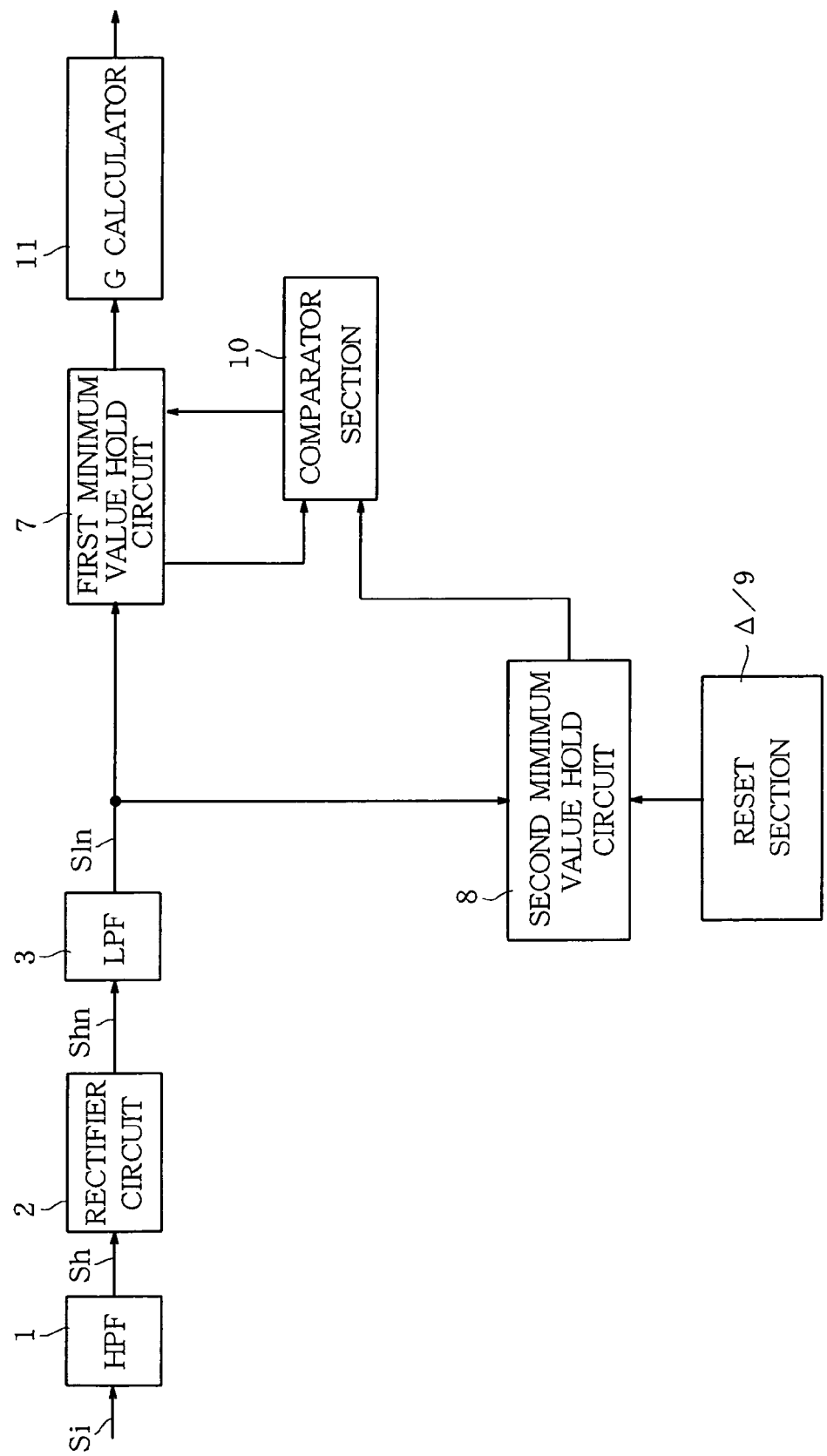
FIG. 1 is a block diagram showing a system of the present invention.
Figure 4:
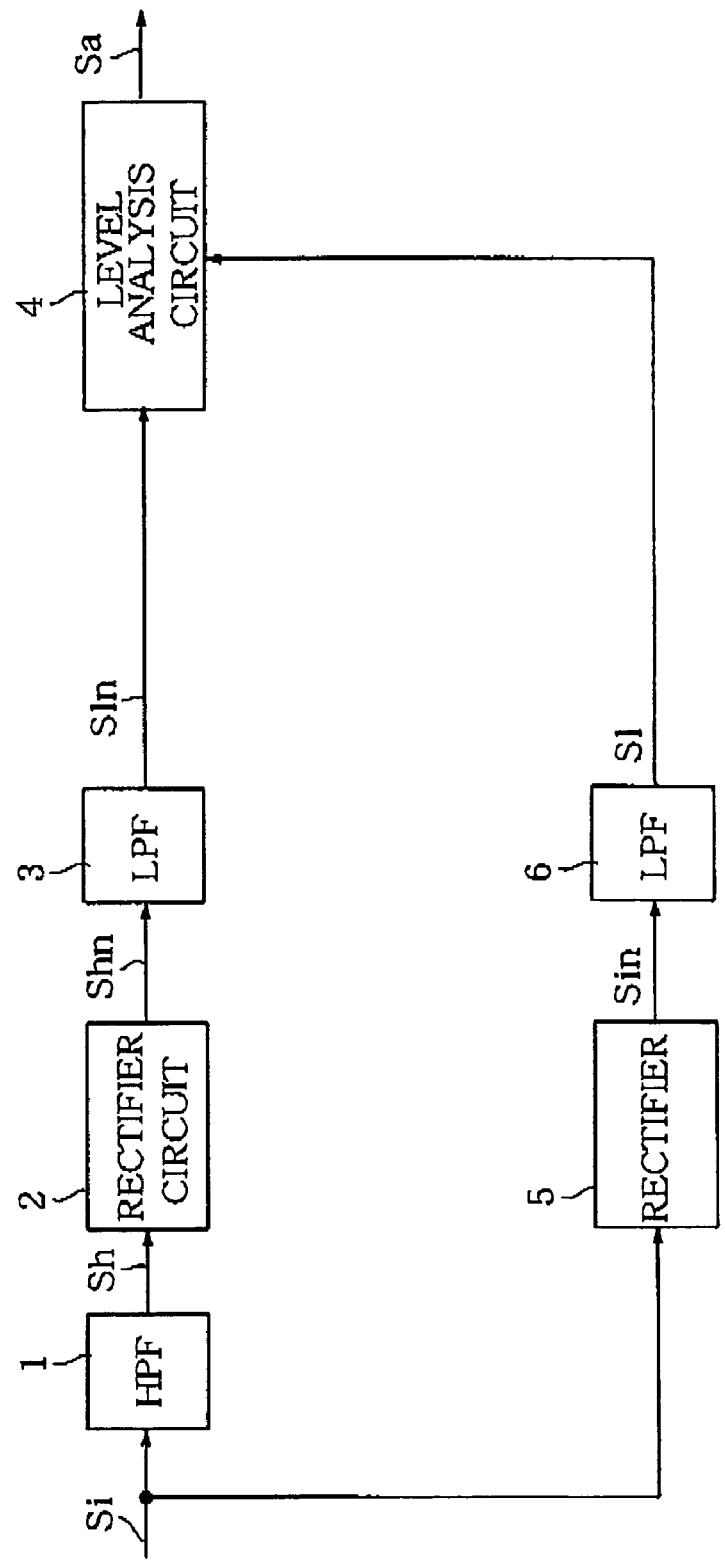
FIG. 4 is a block diagram showing a conventional system.
Figures 5A, 5B, 5C:
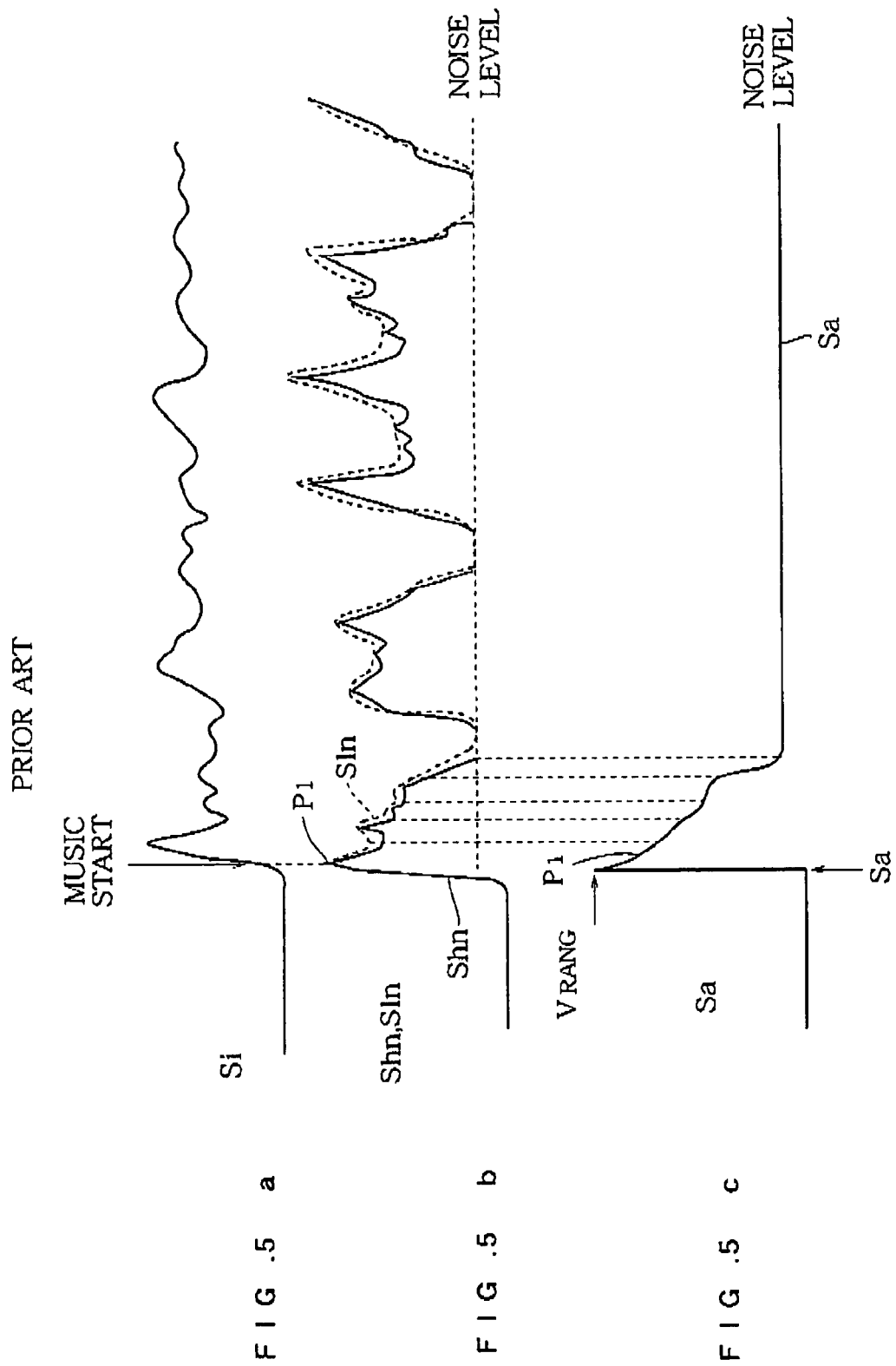
FIGS. 5a to 5c show waveforms of signals in the system of FIG. 4.

Referring to FIG. 1, the high pass filter 1, rectifier circuit 2 and low pass filter 3 are the same as those of FIG. 4.

The output signal Sln of the low pass filter 3, which represents a noise level is applied to a first minimum value hold section 7 and a second minimum value hold section 8.

Figure 3:
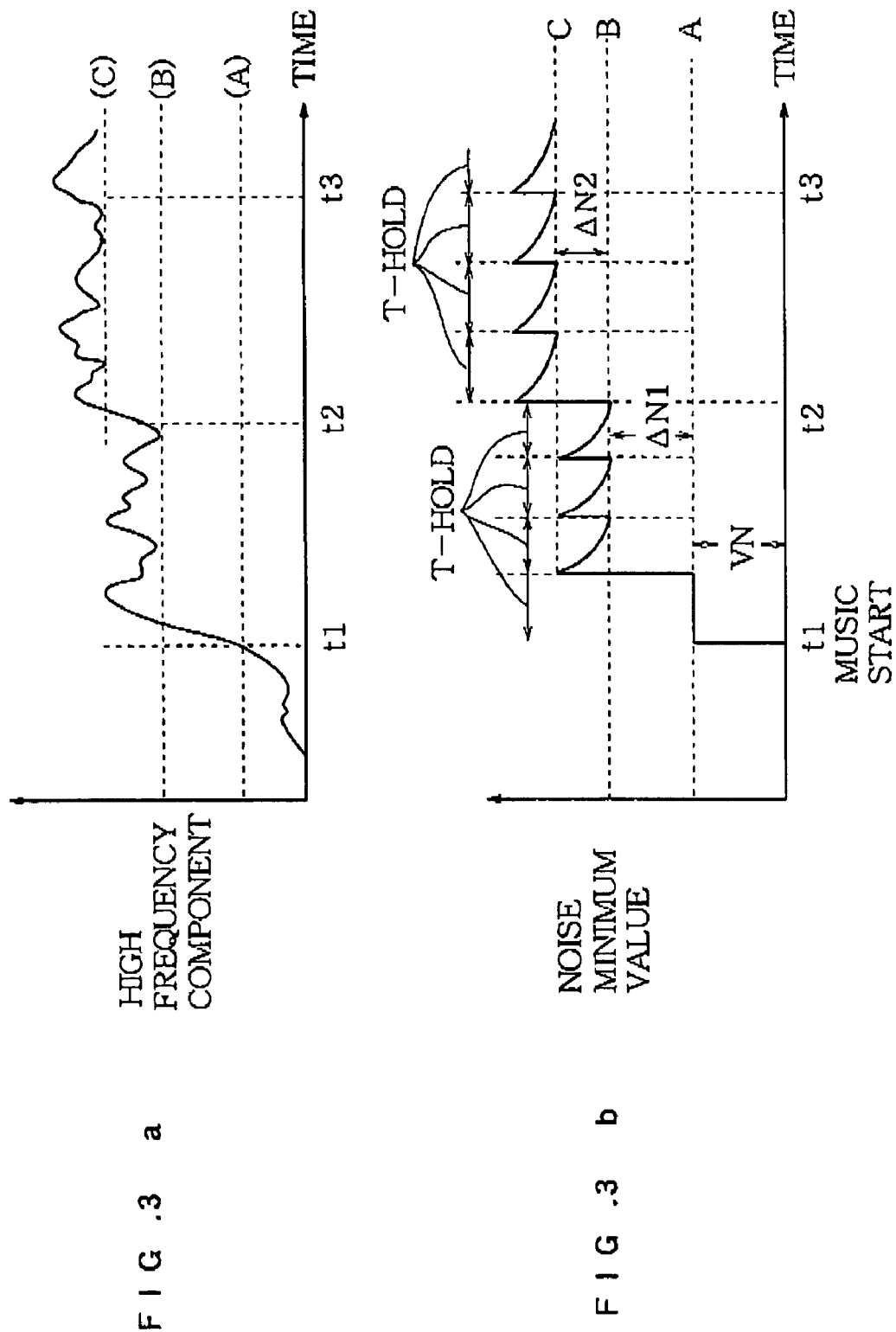
FIGS. 3a and 3b are time charts of the operation.

The first minimum value hold section 7 samples a high frequency component of the music signal at every T-HOLD time (FIG. 3b) and holds a noise minimum reference value A (FIGS. 3a, 3b). The noise minimum reference value A is fed to a comparator 10 and a gain calculator 11. The gain calculator 11 calculates the gain of the music signal and applies the gain to a noise reduction system (not shown).

The second minimum value hold section 8 also samples a high frequency component of the music signal at every T-HOLD time (FIG. 3b) and holds a noise minimum reference value B as a real time reference value (FIG. 3b). A reset circuit 9 resets the output signal of the second minimum value hold circuit 8 at every T-HOLD time, and calculates an average value of values at every three times. The average minimum value B is fed to the comparator 10.

The comparator compares the value B with the value A. When the difference ΔN between values A and B is larger than a predetermined value, the value A is updated to the value B.

Figure 2:
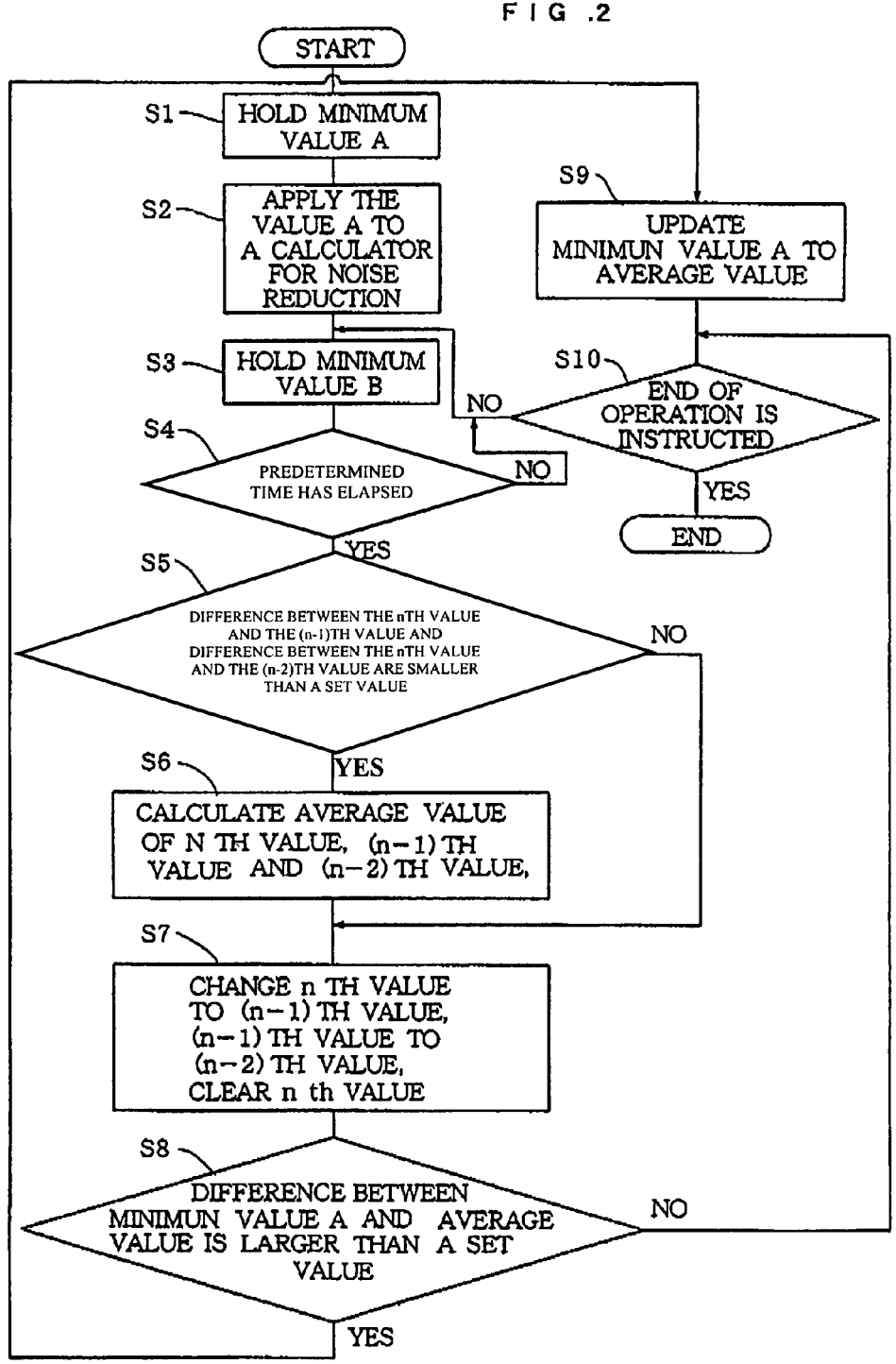
FIG. 2 is a flowchart showing the operation of the system.

The operation of the system will be described with reference to the flowchart of FIG. 2.

At a step S1, the minimum value A is held at the first hold section 7.

The value A is applied to the noise reduction system through the gain calculator 11.

At a step S3, the second hold section 8 holds the minimum value B at the real time. It is determined whether the predetermined T-HOLD time for the sampling time for detecting the real time minimum hold value B has elapsed at a step S4. When the time elapses, the program proceeds to a step S5. At the step S5, it is determined whether the difference between an n-th minimum value and a (n−1)th minimum value, and the difference between the (n−1)th minimum value and a (n−2)th value are smaller than a predetermined value. When it is the case, namely noise levels are substantially constant, an average value of the minimum values of nth, (n−1)th and (n−2)th is calculated at a step S6.

At a step S7, the nth value is changed as the (n−1)th value, the (n−1)th value is changed as the (n−2)th value, and the nth value is cleared for holding a new value B at a step S3 as described later on.

At a step S8, it is determined whether the difference between the minimum value A and the average value is larger than a predetermined value. When the difference is larger than the predetermined value, the minimum value A is updated to the average value at a step S9.

At a step S10, when the end of the operation is instructed, the program ends. If the end is not instructed, the program returns to the step S3, where a new minimum value B is held as an nth value.

In accordance with the present invention, the minimum reference value A is always compared with the average value of the real time value B and the minimum reference value A is updated with the average value B when the difference between the minimum value A and the average value is larger than the Predetermined value. Therefore, noises can be exactly removed even if the noise level changes with time.

While the invention has been described in conjunction with preferred specific embodiment thereof, it will be understood that this description is intended to illustrate and not limit the scope of the invention, which is defined by the following claims.

What is claimed is:

1. A noise level updating system comprising:
   a detecting device which detects a noise level of an input signal;
   a noise level holding section for holding a noise level detected by the detecting device as a reference value;
   a determining device which determines updating of the noise level held in the noise level holding section based on a plurality of subsequent noise levels; and
   an updating device which updates the held noise level in accordance with determination of the determining device,
   wherein the determining device determines the updating of the held noise level when the difference between the subsequent noise levels is smaller than a predetermined value and the difference between the held noise level and an average of the subsequent noise levels is larger than a predetermined value.

* * * * *